T. F. SCHAICK.
AUTOMOBILE BED.
APPLICATION FILED MAR. 11, 1915.
1,156,631.
Patented Oct. 12, 1915.
2 SHEETS—SHEET 1.
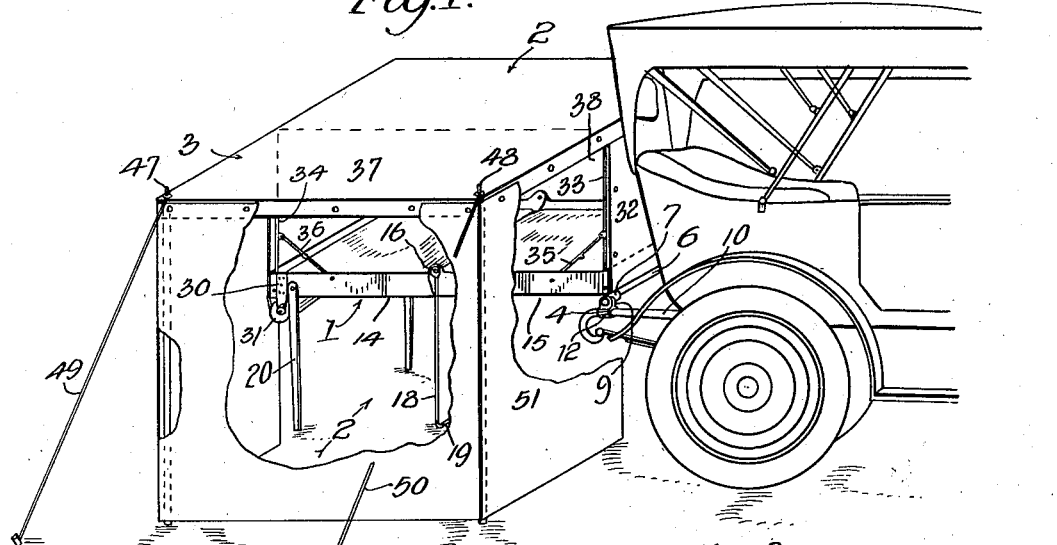
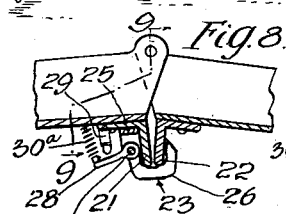
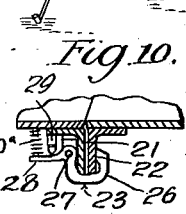
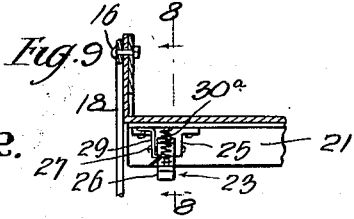
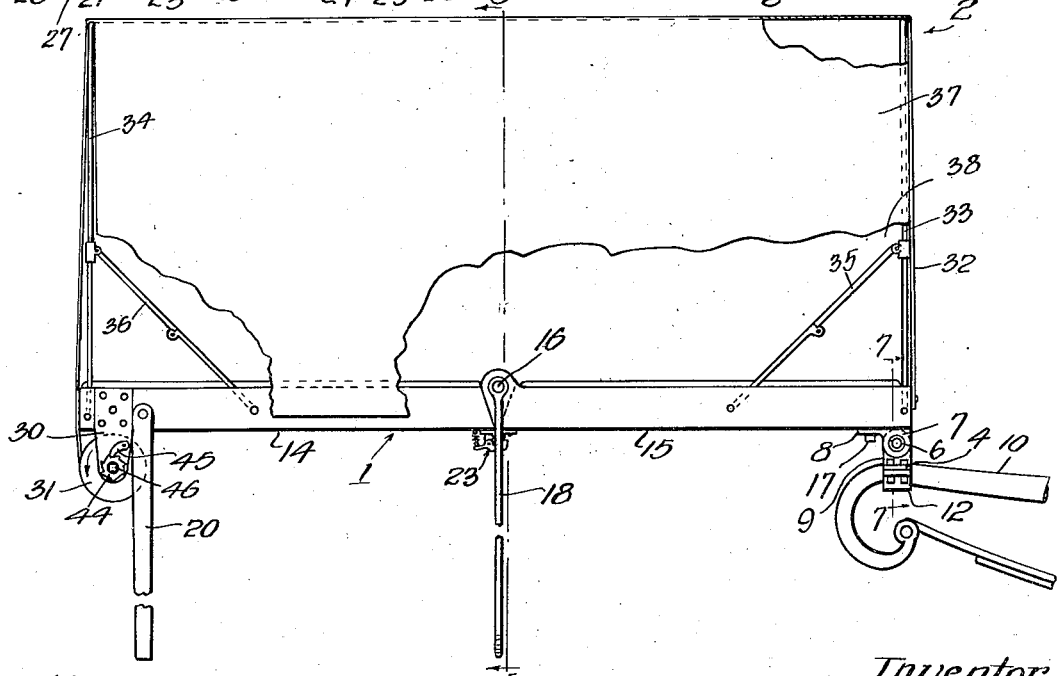
Witnesses:
Clarence J. Williams
Grace Dodge Maquin
Inventor;
Theodore F. Schaick
by James G. Wells,
Attorney

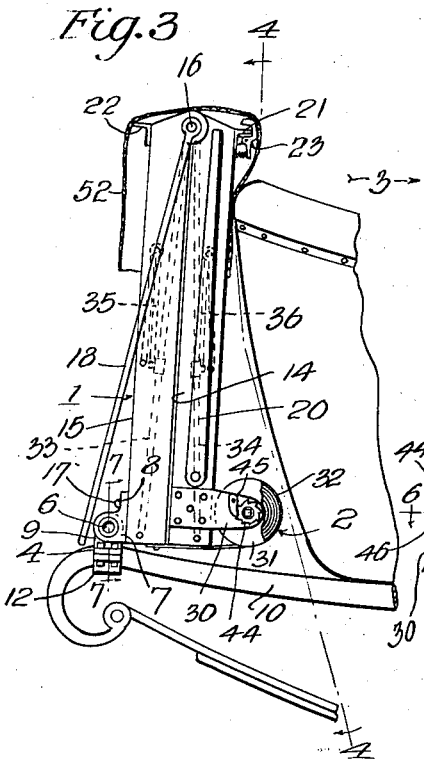

UNITED STATES PATENT OFFICE.

THEODORE F. SCHAICK, OF LONG BEACH, CALIFORNIA.

AUTOMOBILE-BED.

1,156,631.      Specification of Letters Patent.      Patented Oct. 12, 1915.

Application filed March 11, 1915. Serial No. 13,798.

*To all whom it may concern:*

Be it known that I, THEODORE F. SCHAICK, a citizen of the United States, residing at Long Beach, in the county of Los Angeles and State of California, have invented a new and useful Automobile-Bed, of which the following is a specification.

My object is to make a folding bed and tent, which may be mounted upon the rear end of an automobile; and my invention consists of the novel features herein shown, described and claimed.

Figure 1 is a fragmentary perspective, showing the rear end of an automobile with an automobile bed embodying the principles of my invention, unfolded and set up for use. Fig. 2 is an enlarged side elevation of the bed looking in the direction indicated by the arrow 2 in Figs. 1 and 5, the side curtain being down, whereas in Fig. 1 the side curtain is extended to form the roof of the secondary tent. Fig. 3 is a side elevation, looking in the direction of the arrow 3 in Fig. 4, and showing the bed and tent folded up out of use and ready for the road. Fig. 4 is a vertical cross section on the line 4—4 of Fig. 3. Fig. 5 is a vertical cross section on the line 5—5 of Fig. 2. Fig. 6 is a sectional detail of the spring roller upon a reduced scale and taken on the line 6—6 of Figs. 4 and 5. Fig. 7 is a fragmentary sectional detail on the line 7—7 of Figs. 2 and 3. Fig. 8 is an enlarged sectional detail on the line 8—8 of Figs. 5 and 9. Fig. 9 is a fragmentary sectional detail on the line 9—9 of Fig. 8. Fig. 10 is a view analogous to Fig. 8 and showing the parts in a normal working condition, whereas in Fig. 8 the parts are shown in releasing position.

An automobile bed construction, embodying the principles of my invention, comprises a folding bed frame 1, a folding tent 2 carried by the bed frame, and a secondary tent 3 adapted to be erected in connection with the tent 2.

The details of the following bed frame 1 are as follows: Bearing blocks 4 and 5 are adapted to receive the pivot shaft 6 and the pivot shaft 6 is mounted in bearings 7 having ears 8 for attachment to the bed frame. Half-bearings 9 extend downwardly from the bearing blocks 4 and 5 and are adapted to rest upon the side bars 10 and 11 of the automobile. Half-bearings 12 fit under the side bars 10 and 11 and are secured in place by bolts 13 so as to mount the shaft 6 above the side bars 10 and 11 and crosswise thereof. The bed body is built in two sections 14 and 15, connected by hinges 16, said hinges 16 being considerably above the level of the bottom of the bed body, and the section 15 is connected to the ears 8 by bolts 17, so that the section 14 will fall upon the section 15, and the whole bed construction fold upon the shaft 6 to an upright position, as shown in Fig. 3. Legs 18 are connected to the hinge 16, the lower ends of said legs being connected together by the cross bar 19, so that the legs will swing in unison and will fold, the cross bar 19 swinging against the shaft 6, and so that when the bed is pulled downwardly from the folded position shown in Fig. 3, the legs 18 will assume a vertical position and support the rear end of the section 15, while the bed is being still further unfolded and the tent constructed. Folding legs 20 are connected to the sides and rear end of section 14 for supporting said rear end when in its horizontal position, said legs 20 folding against the side of the section when out of use. Angle irons 21 and 22 are secured against the meeting edges of the sections 14 and 15, as shown in detail in Figs. 8 and 10, and spring catches 23 and 24 are connected to one angle iron to engage the other to hold the bed frame in its horizontal position, that is—to hold the sections 14 and 15 in a straight line.

The spring catches 23 and 24 are essentially alike and the details of the spring catch 23 are as follows: A bearing block 25 is secured to the angle iron 21 and a hook 26 is pivotally connected to the bearing block 25 by the pivot pin 27, said hook being adapted to extend downwardly and then under the lower edges of the angle irons 21 and 22 and hook against the angle iron 22. An operating handle 28 extends from the hook 26 and the spring catch 29 is mounted in position to engage the handle 28 when it is pressed to the limit of its unhooked position and the spring 30$^a$ engages the handle 28, the tension of the spring 30$^a$ being exerted to hold the hook 26 in operative position. When it is desired to fold up the bed, the handle 28 is pressed until the catch 29 will hold it and during this operation the center of the bed is slightly elevated to release the tension upon the hook 26. Then the section 14 may be folded upon the section 15. When it is desired to set up the bed, the handles 28 are operated and released from the catches 29 and then, when the section 14 is straightened out relative to the section 15, the angle iron 22 will snap over the end of the hook 26 and the tension of the spring will snap the hook into place, as in Fig. 10. Brackets 30 extend downwardly from the corners of the sections 14 and the spring roller 31 is mounted in these brackets. A strip of canvas 32 is attached to the forward end of section 15 and extends upwardly over the bow 33, then horizontally backwardly over the bow 34, then downwardly and is attached to the spring roller 31. The bows 33 and 34 are like buggy bows and have flat braces 35 and 36 for holding them in their upright positions. When the braces 35 and 36 are folded, the bows 33 and 34 will fold downwardly against the upper faces of the sections 14 and 15. Side curtains 37 and 38 are attached to the sides of the central portion of the canvas 32, so as to extend over the bow 33 and the bow 34, when the tent is set up and extend downwardly to the sides of the bed frame. When it is desired to fold the bed out of use, the side curtains 37 and 38 are folded up on top of the canvas 32 and wound with the canvas upon the spring roller 31.

The details of the spring roller 31 are as follows: The roller body 39 is bored from one end to form a chamber 40, the pintle 41 is mounted in the chamber 40, the inner end operating in the bearing extending from the inner end of the chamber 40 to the coiled spring 42 is mounted upon the pintle, one end of the coiled spring being connected to the pintle and the other end being connected to the roller. The outer end of the pintle is squared to fit in the squared opening in one of the brackets 30, so as to hold the pintle against rotation. The pintle 43 extends through the other end of the roller and is rotatably mounted in the other bracket 30. The pawl wheel 44 is fixed upon the pintle 43 outside of the bracket and the pawl 45 is fixed to the bracket 30 for engaging the pawl wheel. The extreme outer end of the pintle 43 has a wrench seat 46, so that a crank may be applied for winding or unwinding the roller, the object being to assist the tension of the spring 42, when necessary, and so that when the tent has been erected, a crank may be applied to the pintle of the roller and draw the tent or canvas 32 to the desired tautness and the roller will be then locked by the pawl 45. When it is desired to erect the secondary tent 3, the desired one of the side curtains 37 or 38 becomes the top of the secondary tent. Tent poles 47 and 48 are applied to support the outer corners of the side curtain, guys and stakes 49 and 50 are applied to hold the tent poles and a curtain 51 is suspended from the three edges of the side curtain, thus making an inclosed room at the side of the bed. When the bed thus constructed is completely folded and ready for the road, as in Fig. 3, a hood 52 may be placed over the upper end for the purpose of shedding rain and keeping out the dirt.

The details of construction may be varied in many ways without departing from the spirit of my invention, as set up in the following claims.

I claim:

1. An automobile bed construction, comprising a folding bed frame adapted for attachment to an automobile, a roller at the outer end of the bed frame when unfolded, and a tent canvas attached to the opposite end of the bed frame from the roller and extending upwardly over the bed and attached to the roller, and bows for stretching and supporting the canvas.

2. In an automobile bed construction, a bed section adapted for attachment to an automobile and to swing from a horizontal position to a vertical position, legs for supporting the swinging end of the bed section, a second bed section hinged to the first bed section and adapted to fold upon the first bed section and to swing to a straight line with the first bed section, a roller carried by the outer end of the second bed section, a canvas attached to the outer end of the first bed section and extending over the bed sections to the roller, and bows at the outer ends of the bed sections for supporting the canvas.

3. In an automobile bed construction, a folding bed adapted for attachment to an automobile, a canvas attached to one end of the folding bed, a spring roller at the other end of the folding bed and attached to the canvas, folding bows extending upwardly from the bed for supporting the canvas, and side curtains attached to the central portion of the canvas.

4. In an automobile bed construction, a folding bed frame, a roller at one end of the bed frame, a canvas attached to the other end of the bed frame and extending over the bed frame and attached to said roller, a pawl wheel rigid with the roller, means for operating the pawl wheel for stretching the canvas, and a pawl for holding the canvas stretched.

THEODORE F. SCHAICK.

Witnesses:
GRACE DODGE NAQUIN,
SEMER G. WELLS.